United States Patent [19]

Smith et al.

[11] Patent Number: 5,554,402
[45] Date of Patent: Sep. 10, 1996

[54] PROCESS FOR PREPARING BAKED FOOD PRODUCTS HAVING LITTLE OR NO FAT USING AN OAT COMPONENT AS A FAT REPLACEMENT

[75] Inventors: John J. Smith, Hoffman Estates; Carol A. Steinwehe, Marengo, both of Ill.

[73] Assignee: The Quaker Oats Company, Chicago, Ohio

[21] Appl. No.: 174,564

[22] Filed: Dec. 28, 1993

[51] Int. Cl.$^6$ .................................................. A21D 13/00
[52] U.S. Cl. ..................... 426/549; 426/391; 426/439; 426/446; 426/450; 426/555; 426/573; 426/804; 426/622
[58] Field of Search ..................... 426/549, 450, 426/653, 391, 555, 622, 446, 439, 804, 573

[56] References Cited

U.S. PATENT DOCUMENTS

| | | | |
|---|---|---|---|
| 3,975,550 | 8/1976 | Fioriti et al. | 426/553 |
| 4,550,023 | 10/1985 | Schoberth | 426/19 |
| 4,824,683 | 4/1989 | Hodgson et al. | 426/62 |
| 4,996,063 | 2/1991 | Inglett | 426/21 |
| 5,015,486 | 5/1991 | Franssell et al. | 426/243 |
| 5,015,488 | 5/1991 | Van Lengerich et al. | 426/549 |
| 5,053,241 | 10/1991 | Mongeau et al. | 426/603 |
| 5,164,216 | 11/1992 | Engelbrecht et al. | 426/549 |
| 5,192,564 | 3/1993 | Abdelrahman | 426/19 |

FOREIGN PATENT DOCUMENTS

| | | | |
|---|---|---|---|
| 351483 | 7/1979 | Austria | A21D 13/04 |
| 3504596 | 8/1986 | Germany | A21D 13/02 |
| 11247 | 5/1911 | United Kingdom . | |
| 19109 | 11/1912 | WIPO | A21D 2/36 |

OTHER PUBLICATIONS

"Baking and Related Properties of Wheat–Oat Composite Flours", B. Oomah, CEREAL CHEMISTRY, vol. 60, No. 3 pp. 220–227, Jun. 1983.

"A Rheological Investigation of Oat Starch Pastes": J. L. Doublier, D. Paton and G. Llamas; Cereal Chem. 64 (1):21–26 (1987).

"Comparison of Oat and Wheat Carbohydrates. II. Starch": L. A. MacArthur and B. L. Appolonia; Cereal Chem. 56 (5):458–461 (1979).

"Oat Starch: Some Recent Developments": D. Paton; Starch/Starke 31 (6):184–187 (1979).

"Oat Starch: Part 1. Extraction, Purification and Pasting Properties": D. Paton; Die Starke 29 (5):149–153 (1977).

"Diffirential Scanning Calorimetry of Oat Starch Pastes": D. Paton; Cereal Chem. 64 (6):394–399 (1987).

"Functional (Breadmaking) and Biochemical Properties of Wheat Flour Components. VIII. Starch": R. C. Hoseney, K. F. Finney, Y. Pomeranz and M. D. Shogren; Cereal Chem. 48 (2): 191–202 (1971).

"Konjac Flour": FMC Corporation, Marine Collids Division; Introductory Bulletin K–1 (1989).

"Anti–Staling Fat Mimetic: Too Good To Be True?": A. E. Staley Co; Prepared Foods Aug. 1991; pp. 133–134.

Primary Examiner—Esther M. Kepplinger
Assistant Examiner—Lien Tran
Attorney, Agent, or Firm—Mart C. Matthews; Lars S. Johnson

[57] ABSTRACT

A process for preparing a baked food product containing little or no fat, said process comprising: (a) preparing an initial mixture comprising from about 10% to about 35% by weight, as a percentage of the initial mixture, of an oat component selected from oat flour, oat bran, oat bran concentrate, defatted oat flour, defatted oat bran, defatted oat bran concentrate, and mixtures thereof, and the balance water; (b) hydrating the oat component in the initial mixture to form a hydrated mixture; (c) combining the hydrated mixture with flour and other necessary ingredients for preparing a baked product to form a baking mixture, wherein the amount of hydrated mixture combined is that amount sufficient to provide a low-fat or no-fat baked product having taste and textural properties which are substantially similar to the taste and textural properties of a full-fat version of the particular baked product; and (d) heating the baking mixture for a sufficient time and temperature to prepare a fully baked product. A baked product containing little or no fat is prepared by this process.

9 Claims, No Drawings

PROCESS FOR PREPARING BAKED FOOD PRODUCTS HAVING LITTLE OR NO FAT USING AN OAT COMPONENT AS A FAT REPLACEMENT

FIELD OF INVENTION

The present invention relates to a process for preparing baked food products having little or not fat. These baked food products are prepared using an oat-based fat substitute. The fat substitute is prepared from oat flour, oat bran, oat bran concentrate, defatted oat flour, defatted oat bran, defatted oat bran concentrate, and mixtures thereof.

1. Background of Invention

Dietary fat intake has been associated with a number of undesired health problems such as obesity, cardiovascular disease, increased cholesterol levels, etc. Thus, there is a great desire to prepare foods which contain little or no fat. This can be accomplished by using fat replacements during the preparation of the food.

There are a number of fat replacements known in the art. However, there are also a number of problems associated with many of these fat replacements. One such problem is that some fat replacements may not provide a final product having the same texture and/or mouthfeel as a product prepared with fat. For example, when certain fat replacements are used to prepare baked products, the final baked product is tougher, dryer (less moist) and has a lower volume than a product prepared with fat. Other examples of such problems include fat replacements which lack heat stability or exhibit undesirable physical effects on consumers, for example anal leakage.

Thus, the most desired foods prepared using fat replacements would have properties that mimic foods prepared with fats in all these areas, i.e., would provide products having the same or similar taste, feel, texture, heat stability and cooking properties as products prepared from fats, and yet would not possess or cause any of the undesirable properties or effects described above and would not have any additional undesirable physical effects of their own. Even more desirable would be foods prepared using easily prepared fat replacements made of natural, unmodified ingredients. The baked food products prepared in accordance with the process of the present invention have such attributes.

2. Background Art

There are currently many low-fat and no-fat food items sold in the marketplace. These low-fat and no-fat food items usually contain known fat replacements. Modified starches are known in the art as being useful as fat substitutes in such food products. For example, the A. E. Staley Manufacturing Company, located in Decatur, Ill., produces a modified food starch which sells under the brand name of Stellar and is claimed to be useful as a fat substitute. Another example is a water soluble dietary fiber composition prepared by treatment of oat milled products with alpha-amylases, as described in U.S. Pat. No. 4,996,063, issued Feb. 26, 1991 to Inglet.

It is also known that there are certain tuber starches which are useful as fat replacements in low-fat and no-fat food products. For example, a product called Paselli SA2, available from Avebe, located in Foxhol, Holland, is a modified potato starch which has been enzymatically treated by hydrolyzing the amylopectin and amylose fraction of the potato starch to a limited degree. The fat replacer is a white powder with a pH of 5.5–7.0, a dextrose equivalent (DE) of 3, and a bulk density of 400 kg/m3. Hydrated konjac flour is also taught as being useful as a fat replacement in low-fat and no-fat foods. Konjac flour is the generic name of the powdered tuber from *Amorphophallus konjac*.

The art also teaches the preparation of oat starch pastes. For example, the article entitled *A Rheological Investigation of Oat Starch Pastes*; J. Doubelier, D. Paton, and G. Llamas; Cereal Chem.; 64(1):21–26 (1987), teaches a method of preparing an oat starch paste wherein weighed amounts of oat starch are slurried in water and then rapidly heated with stirring. Pastes were prepared from the starches at combinations of both high speed stirring (750 RPM) and low speed stirring (200 RPM) and under a high (6° C./min.) and low (1° C./min.) heating rate. This reference teaches preparing pastes using native and defatted oat starch.

However, there is nothing in the art which teaches that baked food products having little or no fat can be prepared using an unmodified, easily prepared, hydrated oat component selected from oat flour, oat bran, oat bran concentrate, defatted oat flour, defatted oat bran, defatted oat bran concentrate, and mixtures thereof, as a fat substitute.

It is therefore an object of the present invention to provide a process for preparing low-fat or no-fat baked food products which sufficiently mimic the properties fat imparts to foods, thereby rendering the taste and texture of baked products having typical fat levels to such low- or no-fat baked products.

It is another object of the present invention to provide a process for preparing such low- or no-fat baked food products using such an unmodified fat substitute which is easily prepared using a hydrated oat component selected from oat flour, oat bran, oat bran concentrate, defatted oat flour, defatted oat bran, defatted oat bran concentrate, and mixtures thereof. It is still another object of the present to prepare a product by such a process. It is still a further object of the present invention to provide a method of using said hydrated oat component as a fat substitute.

These objects are accomplished by the invention described herein.

SUMMARY OF THE INVENTION

The present invention relates to a process for preparing a baked food product containing little or no fat, said process comprising:

(a) preparing an initial mixture comprising from about 10% to about 35% by weight, as a percentage of the initial mixture, of an oat component selected from oat flour, oat bran, oat bran concentrate, defatted oat flour, defatted oat bran, defatted oat bran concentrate, and mixtures thereof, and the balance water;

(b) hydrating the oat component in the initial mixture to form a hydrated mixture;

(c) combining the hydrated mixture with flour and other necessary ingredients for preparing a baked product to form a baking mixture, wherein the amount of hydrated mixture combined is that amount sufficient to provide a low-fat or no-fat baked product having taste and textural properties which are substantially similar to the taste and textural properties of a full-fat version of the particular baked product; and (d) heating the baking mixture for a sufficient time and temperature to prepare a fully baked product.

The present invention further comprises the baked food product prepared by the above-described process. The present invention further comprises a method wherein a hydrated mixture comprising from about 10% to about 35% by weight, as a percentage of the hydrated mixture, of an oat component selected from oat flour, oat bran, oat bran concentrate, defatted oat flour, defatted oat bran, defatted oat bran concentrate, and mixtures thereof, and the balance water, is used as a fat replacement in the preparation of baked goods, wherein said hydrated mixture has a gel strength in the range of from about 288 mm to about 400 mm, as measured by a Universal penetrometer using a dish size of 5 cm diameter and a 1.3 cm depth.

DETAILED DESCRIPTION OF THE INVENTION

The present invention comprises a process for preparing baked food products which contains little or no fat. The types of baked food products which can be prepared by the process of the present invention include muffins, biscuits, cakes, dinner rolls, scones, cookies and breads.

In the process of the present invention an initial mixture is prepared comprising from about 10% to about 35%, preferably from about 20% to about 30%, more preferably from about 22% to about 28% by weight of an oat component, expressed as a percentage of the initial mixture.

The oat component is selected from oat flour, oat bran, oat bran concentrate, defatted oat flour, defatted oat bran, defatted oat bran concentrate, and mixtures thereof. Oat flour is preferred due to its availability, price and ease of preparation. However, in situations where baked products having lower levels of fat, or no fat, are desired, defatted oat flour is preferred.

When the oat component is selected from oat flour and/or defatted oat flour, the initial mixture comprises from about 15% to about 35%, preferably from about 20% to about 30%, more preferably from about 22% to about 28% by weight, expressed as a percentage of the initial mixture. When the oat component is selected from oat bran, defatted oat bran, oat bran concentrate, and/or defatted oat bran concentrate, the initial mixture comprises from about 10% to about 30%, preferably from about 15% to about 25%, more preferably from about 18% to about 23% by weight, expressed as a percentage of the initial mixture.

The oat component can be obtained from sources known to those skilled in the art. For example, the oat flour and oat bran can be obtained from The Quaker Oats Company, located in Chicago, Ill., ConAgra Flour Milling Co., located in Omaha, Nebr., and National Oats Company, Inc., located in Cedar Rapids, Iowa. The oat bran concentrate can be obtained from Alko, Ltd., located in Koskenkorua, Finland, which is marketed in the United States by A&B Ingredients, located in Fairfield, N.J.

The defatted oat flour, defatted oat bran, and defatted oat bran concentrate can be obtained by subjecting commercially available oat flour, oat bran, and oat bran concentrate to defatting methods known to those skilled in the art. Examples of such methods include, but are not limited to, supercritical fluid extraction methods and hexane treatment methods.

The initial mixture may also contain other ingredients desirable, but not necessary, for the preparation of the baked good product. Care must be taken, however, to avoid adding desirable ingredients to the initial mixture which inhibit the hydration of the oat component. Examples of such other desirable ingredients include, but are not limited to, spices, natural and artificial flavors, and natural and synthetic emulsifiers. Examples of such natural and synthetic emulsifiers include, but are not limited to, lecithin, mono- and diglycerides, distilled monoglycerides, diacetyl tartaric acid esters of monoglycerides, and sucrose polyesters.

It is believed that the initial mixture should not contain ingredients which are necessary for the preparation of the baked good product, such as those necessary ingredients discussed hereinafter which are combined with flour and the hydrated mixture to form the baking mixture.

When such desirable ingredients are incorporated into the initial mixture, it is to ease the preparation of the final baked product. In some instances these necessary ingredients and other desirable ingredients may be partially incorporated into the initial mixture and partially added separately from the initial mixture to prepare the final baked good product prepared by the process of the present invention.

The amounts and specific necessary ingredients and other desirable ingredients that are incorporated into the initial mixture depends upon the particular baked good product being prepared, and will be the same as used in the preparation of a full-fat version of the particular baked good product, adjusting for the differences in the level of fat used to prepare a full-fat version of the baked good product and the level of hydrated mixture used to prepare the low- or no-fat baked good product of the present invention.

The balance of the initial mixture comprises water. Any type of water (i.e., tap, potable, distilled, deionized, etc.) can be used in the present invention.

After the initial mixture is prepared, the oat component contained therein is hydrated, thereby forming a hydrated mixture. This hydration can be accomplished by any means known to those skilled in the art. Examples of hydration methods include, but are not limited to, allowing the initial mixture to stand at room temperature over a period of time until the oat component contained therein becomes sufficiently hydrated; combining the oat component and water in a high shear mixer and mixing until the oat component becomes sufficiently hydrated; and heating the initial mixture, which acts to increase the hydration rate, until the oat component is sufficiently hydrated, which is preferred.

In a more preferred heating method of hydration, the initial mixture is heated to a temperature in the range of from about 40° C. to about 75° C., more preferably from about 45° C. to about 60° C., still more preferably from about 50° C. to about 55° C. Once this temperature has achieved, the hydration is completed.

Still more preferred is carrying out such heating in conjunction with agitation, e.g., stirring, typically using a stirrer operating at a speed in the range of from about 10 RPM to about 70 RPM, preferably from about 15 RPM to about 60 RPM, still more preferably from about 25 RPM to about 45 RPM.

When the hydrated mixture is sufficiently hydrated, it exhibits the fat mimicking properties described herein in a baked product. Whether a particular hydrated mixture is sufficiently hydrated can be determined by its gel strength. The desired gel strength is dependent upon the particular oat component being utilized and the particular method utilized for measuring the gel strength.

The hydrated mixture is considered sufficiently hydrated when it exhibits a gel strength in the range of from about 288 mm to about 400 mm, more preferably to about 294 mm to about 375 mm, still more preferably from about 325 mm to about 367 mm. The above gel strength values are measured by a Universal penetrometer using a dish size of 5 cm diameter and a depth of 1.3 cm.

After the hydrated mixture is prepared it is combined with flour and necessary ingredients and other desirable ingredients for preparing a baked product, thereby forming a baking mixture. The total amounts and types of necessary ingredients and other desirable ingredients used to prepare the baked good product of the present invention depends upon the particular type of baked good product being prepared. Such amounts and types will be substantially the same as used for preparing a corresponding full-fat version of the same baked good product, adjusting for the differences in the level of fat used to prepare a full-fat version of the particular baked good product and the level of hydrated mixture used to prepare the baked good product of the process of the present invention. Furthermore, such necessary ingredients and other desirable ingredients may have been already been either partially or totally incorporated into the initial mixture already discussed herein, and are added to the baking mixture via the hydrated mixture resulting form the initial mixture.

Examples of baked good products having a 50% reduction in fat level which are prepared by the process of the present invention, including necessary and other desirable ingredients and the amounts of such ingredients, are as follows: biscuits comprise from about 40% to about 50% by weight wheat flour, from about 20% to about 40% by weight skim milk, from about 6% to about 8% by weight shortening, from about 2% to about 3% by weight leavening, from about 1.1% to about 1.4% by weight salt, from about 6% to about 8% by weight hydrated mixture, from about 0.3% to about 0.4% by weight flavorings, and from about 0.3% to about 0.4% by weight emulsifier, wherein said ingredient weight percentages are a percentage of the final baked biscuit; muffins comprise from about 27% to about 33% by weight wheat flour, from about 15% to about 25% by weight water, from about 15% to about 30% by weight sugar, from about 3.6% to about 4.4% by weight vegetable oil, from about 1% to about 3% by weight margarine, from about 1.8% to about 2.2% by weight dried egg, from about 1.8% to about 2.2% by weight dried milk, from about 0.5% to about 2.0% by weight leavening, from about 11.7% to about 14.3% by weight hydrated mixture, from about 0.4% to about 0.8% by weight salt, from about 0.1% to about 0.6% by weight flavorings, and from about 0.3% to about 1.0% by weight emulsifier, wherein said ingredient weight percentages are a percentage of the final baked muffin; yellow cake comprises from about 25% to about 30% by weight sugar, from about 26% to about 32% by weight wheat flour, from about 13% to about 17% by weight water, from about 10% to about 13% by weight whole egg, from about 2% to about 4% by weight shortening, from about 1.8% to about 3.0% by weight nonfat dried milk, from about 1.8% to about 2.2% by weight leavening, from about 0.4% to about 0.6% by weight salt, from about 7% to about 9% by weight hydrated mixture, from about 0.1% to about 0.4% by weight emulsifier, and from about 0.2% to about 0.3% by weight flavorings, wherein said ingredient weight percentages are a percentage of the final baked yellow cake; chocolate chip cookies comprise from about 22% to about 28% by weight wheat flour, from about 22% to about 28% by weight chocolate chips, from about 14% to about 20% by weight sugar, from about 3% to about 5% by weight margarine, from about 7% to about 9% by weight whole eggs, from about 3% to about 8% by weight brown sugar, from about 0.4% to about 0.6% by weight salt, from about 0.4% to about 0.6% by weight leavening, from about 0.1% to about 0.4% by weight emulsifier, from about 0.4% to about 0.6% by weight flavoring, from about 10% to about 14% by weight hydrated mixture, and from about 3% to about 4% by weight water, wherein said ingredient weight percentages are a percentage of the final baked chocolate chip cookies; and scones comprise from about 28% to about 35% by weight wheat flour, from about 1.5% to about 2.0% by weight leavening, from about 4% to about 5% by weight currants, from about 4.5% to about 5.5% by weight margarine, from about 4.5% to about 5.5% by weight hydrated mixture, from about 22% to about 28% by weight skim milk, from about 18% to about 23% by weight oatmeal, and from about 5% to about 7% by weight sugar, wherein said ingredient weight percentages are a percentage of the final baked scone.

The baking mixture typically comprises from about 2% to about 25%, preferably from about 4% to about 20%, more preferably from about 5% to about 15% by weight hydrated mixture, and from about 15% to about 60%, preferably from about 20% to about 55%, more preferably from about 25% to about 40% by weight flour, based on the weight of the baking mixture, with the balance comprising any necessary and other desirable ingredients not already incorporated into the hydrated mixture. This baking mixture is typically in the form of a dough.

The hydrated mixture is typically combined with the flour and other necessary and desirable ingredients in the manner shortening and/or other fats would be combined for the baked particular product being prepared. By this, it is meant that the hydrated mixture will be added at the point in the process where shortening and/or other fats would normally be added to prepare the baking mixture. For example, when preparing biscuits with shortening and/or other fats, the shortening and/or other fats are typically added by cutting and/or mixing with flour prior to the addition of milk. This is the same point and manner in which the hydrated mixture would be added in the process of the present invention.

The manner in the hydrated mixture is added for a particular baked product will, of course, depend upon the particular baked product being prepared and can be determined by one skilled in the art. However, it is worth noting that in some instances it may not be necessary that the hydrated mixture be added in the exact same manner, i.e., at the same exact point as shortening and/or other fats would be added when preparing a full-fat baked product.

The amount of hydrated mixture combined with the flour and other necessary ingredients to form the baking mixture is that amount sufficient to provide a low-fat or no-fat baked product having taste and textural properties that are substantially similar to the taste and textural properties of a full-fat version of the particular baked product being prepared, and is within the range already described herein. By "full-fat version", it is meant the baked product that is prepared by adding the amount of shortening and/or fat that is typically added for the particular type of baked product, e.g., the amount of shortening and/or fat that would be normally added when preparing a biscuit (20% by weight of the biscuit).

Of course, the amount of hydrated mixture necessary for preparing a particular baked product, while falling within the broad range already specified herein, will vary depending upon the particular baked product being prepared. For biscuits, the amount of hydrated mixture added to the flour and other necessary ingredients is in the range of from about 2% to about 20%, preferably from about 4% to about 15%, more preferably from about 6% to about 8% by weight, based on the weight of the resulting baking mixture. For muffins, the amount of hydrated mixture combined with the flour and other necessary ingredients is in the range of from about 2% to about 16%, preferably from about 7% to about 15%, more preferably from about 11% to about 14% by weight, based on the weight of the resulting baking mixture. For cakes, the amount of hydrated mixture combined with the flour and other necessary ingredients is in the range of from 2% to about 20%, preferably from about 5% to about 15%, more preferably from about 7% to about 9% by weight, based on the weight of the resulting baking mixture. For cookies, the amount of hydrated mixture combined with the flour and other necessary ingredients is in the range of from about 2% to about 25%, preferably from about 5% to about 20%, more preferably from about 11% to about 14% by weight, based on the weight of the resulting baking mixture. For scones, the amount of hydrated mixture combined with the flour and other necessary ingredients is in the range of from about 2% to about 20%, preferably from about 4% to about 10%, more preferably from about 4.5% to about 5.5% by weight, based on the weight of the resulting baking mixture.

The type and amounts of flour used is also dependent upon the final baked product desired. One skilled in the art will appreciate the type and amounts of flour necessary to prepare the final product as well. For example, if preparing a yellow cake, from about 25% to about 32% by weight cake flour or wheat flour, based on the weight of the baking mixture, would be used; if preparing cookies, from about 20% to about 28% by weight whole wheat flour, based on the weight of the baking mixture, would be used.

After the baking mixture is prepared, it is often in the form of a dough, and in such an instance will typically exhibit the textural and other properties which a dough for a full-fat version of the baked good product will exhibit. As such, one skilled in the art can formulate the precise baking mixture of the present invention accordingly. The baking mixture may not always resemble a dough, however. For example, if a cake is being prepared the baking mixture would be in the form of a batter.

After the baking mixture is prepared, it is usually formed into the desired product shape, e.g., shaping a dough form, by pouring a batter into a shaped cooking container, etc. For example, a muffin may be formed into a typical muffin shape; bread may be formed into a loaf shape; biscuits may be formed into a biscuit shape.

After the baking mixture is prepared, and shaped if so desired, it is heated for a sufficient time and temperature to prepare a fully baked product. The temperature and time requirements will be the same as for full-fat versions of the particular baked good being prepared, and will be appreciated by one skilled in the art. The use of the hydrated mixture in the present invention is not believed to have an effect on the conditions under which a particular product is baked. Examples of heating conditions for respective baked products include, but are not limited to, the following: for scones, the baking mixture will be heated at a temperature in the range of from about 182° C. to about 199° C., preferably from about 185° C. to about 196° C., more preferably from about 187° C. to about 193° C., for a period of time in the range of from about 15 to about 40 minutes, preferably from about 20 to about 35 minutes, more preferably from about 25 to about 30 minutes; for a muffin, the baking mixture will be heated at a temperature in the range of from about 182° C. to about 199° C., preferably from about 185° C. to about 196° C., more preferably from about 188° C. to about 193° C., for a period of time in the range from about 10 to about 40 minutes, preferably from about 15 to about 35 minutes, more preferably from about 20 to about 30 minutes; for a biscuit the baking mixture will be heated at a temperature in the range of from about 187° C. to about 249° C., preferably from about 193° C. to about 243° C., more preferably from about 211° C. to about 238° C., for a period of time in the range of from about 8 to about 25 minutes, preferably from about 13 to about 20 minutes, still more preferably from about 18 to about 15 minutes; and for a cake, the baking mixture will be heated at a temperature in a range of from about 168° C. to about 191° C., preferably from about 171° C. to about 179° C., more preferably from about 174° C. to about 177° C., for a period of time in the range of from about 15 to about 45 minutes, preferably from about 20 to about 40 minutes, still more preferably from about 20 to about 35 minutes. Other baking methods such as convection or microwave ovens can also be used in the present invention. One skilled in the art will be able to determine the time and temperature/power requirements of such other baking methods based on the baking parameters specified above.

A preferred process of the present invention comprises:
 (a) preparing an initial mixture comprising from about 22% to about 28% by weight of oat flour, based on the weight of the initial mixture, and the balance water;
 (b) hydrating the oat flour contained in the initial mixture by heating the initial mixture to a temperature in the range of from about 50° C. to about 55° C., thereby forming a hydrated mixture having a gel strength in the range of from about 325 mm to about 367 mm, as measured by a Universal penetrometer using a dish size of 5 cm diameter and a depth of 1.3 cm;
 (c) combining the hydrated mixture with wheat flour and other ingredients as necessary for preparing a baked product to form a baking mixture, wherein the baking mixture comprises from about 5% to about 15% by weight hydrated mixture, and from about 25% to about 40% by weight wheat flour; and
 (d) heating the baking mixture at a temperature in the range of from about 211° C. to about 238° C. for a period of time in the range of from about 8 to about 15 minutes.

This preferred process is especially preferred for preparing a fully baked biscuit.

The present invention also relates to a baked food product containing little or no fat prepared by the method described herein, including, but not limited to, the method comprising:
 (a) preparing an initial mixture comprising from about 10% to about 35% by weight, as a percentage of the initial mixture, of an oat component selected from oat flour, oat bran, oat bran concentrate, defatted oat flour, defatted oat bran, defatted oat bran concentrate, and mixtures thereof, and the balance water;
 (b) hydrating the oat component in the initial mixture to form a hydrated mixture;
 (c) combining the hydrated mixture with flour and other raw ingredients as necessary for preparing a baked product to form a baking mixture, wherein the amount of hydrated mixture combined is that amount sufficient to provide a low-fat or no-fat baked good product having taste and textural properties that are substantially similar to the taste and textural properties of provided a full-fat version of the particular baked product; and
 (d) heating the baking mixture for a sufficient time and temperature to prepare a fully baked product.

Such products have already been described herein and include muffins, cakes, biscuits, scones, bread, dinner rolls, and cookies.

The present invention also relates to the method of using the hydrated mixture of the present invention as a fat-replacement in baked goods. The hydrated mixture is as described herein. The amount of hydrated mixture used to prepare such baked goods is dependent upon the particular baked good being prepared, and is as already described herein for the preparation of the baking mixture of the process of the present invention.

The present invention is further illustrated, but not limited by, the following examples.

EXAMPLES

Example 1

An oat flour gel used as the oat-based fat replacer in the following example is prepared by the following process: (1) place 75 grams of water in a blender jar; (2) add 25 grams of oat flour to the water to form an aqueous composition; (3) blend the aqueous composition on high speed for 30 seconds to form a blended mixture; (4) transfer the blended mixture to a 250 ml beaker, cover the beaker with food-grade plastic wrap, and heat the blended mixture to a temperature of approximately 130° F.; and (5) use resulting gel as a fat replacement in preparing baked products.

Example 2

Regular and low fat biscuits are prepared using the following formulas and process (note that the values provided represent grams of each ingredient):

| INGREDIENT | CONTROL | LOW-FAT BISCUIT |
|---|---|---|
| All-Purpose Flour | 46.445 | 0 |
| Cake Flour | 0 | 46.445 |
| Skim Milk | 36.405 | 36.405 |
| Shortening | 13.250 | 6.625 |
| Oat Flour Gel[1] | 0 | 6.625 |
| Baking Powder | 2.854 | 2.854 |
| Salt | 1.046 | 1.046 |
| Total | 100.000 | 100.000 |

[1]Gels prepared from oat bran and oat bran concentrate gels can also be used.

Both types of biscuits are prepared as follows: (1) an oven is preheated to a temperature of 450° F.; (2) the dry ingredients are combined in a large bowl to prepare a dry mixture; (3) the oat flour gel of example 1 and/or shortening are cut into the dry mixture with a pastry knife until a second mixture is prepared which resembles coarse crumbs; (4) milk is stirred quickly into the second mixture until a soft dough is formed; (5) the dough is turned onto a floured surface and kneaded for six strokes; (6) the dough is rolled out with a floured rolling pin, folded two times, while rolling out the dough after each fold, and rolled to a final height of ½ inch; (7) the biscuits are cut with a floured 2 inch biscuit cutter; (8) the biscuits are placed on an ungreased cookie sheet; and (9) the biscuits are baked for approximately 12 minutes until golden brown. The low-fat products are very similar to the full-fat products in terms of texture (softness and chewiness), appearance (color, volume, and surface texture), and mouthfeel.

Example 3

Regular and low fat muffins are prepared using the following formulas and process (note that the values provided represent grams of each ingredient):

| INGREDIENT | CONTROL | LOW-FAT MUFFIN |
|---|---|---|
| All-Purpose Flour | 30.25 | 0 |
| Cake Flour | 0 | 30.25 |
| Sucrose | 28.00 | 28.00 |
| Water | 20.00 | 20.00 |
| Vegetable Oil | 13.00 | 0 |
| Oat Flour Gel[2] | 0 | 13.00 |
| Margarine | 2.50 | 1.93 |
| Dried Whole Eggs | 2.00 | 2.00 |
| Non-Fat Dried Milk | 2.00 | 1.50 |
| Baking Powder | 1.50 | 1.50 |
| Sucrose Ester[3] | 0 | 0.57 |
| Salt | 0.75 | 0.75 |
| Total | 100.00 | 100.00 |

[2]Gels prepared from oat bran and oat bran concentrate gels can also be used.
[3]The sucrose ester is an emulsifier.

Both types of muffins are prepared as follows: (1) the sugar and margarine are creamed for 3 minutes at low speed using a Hobart 5 Quart Mixer; (2) scrape the mixer bowl and mix the creamed sugar and margarine for an additional 2 at low speed; (3) separately mix the dry ingredients for 2 minutes on low speed; (4) combine the dry ingredients with the creamed sugar and margarine and mix the combination for minutes on low speed; (5) add one half of the water and all the oat flour gel of example 1 and/or oil, and mix the resulting mixture for 1 minute on low speed; (6) add the remaining water and mix the resulting mixture for 3 minutes on medium speed; and (7) deposit the resulting batter in lined muffin tins and bake at 375° F. for 28 minutes in a conventional oven. The low-fat products are very similar to the full-fat products in terms of texture (softness and chewiness), appearance (color, volume, and surface texture), and mouthfeel.

Example 4

A regular yellow cake and a low fat yellow cake are prepared using the following formulas and process (note that the values provided represent grams of each ingredient):

| INGREDIENT | CONTROL | LOW FAT YELLOW CAKE |
|---|---|---|
| Sugar | 142.05 | 142.05 |
| Cake Flour | 120.15 | 145.15 |
| Water | 101.10 | 75.00 |
| Whole Fresh Eggs | 59.50 | 59.50 |
| Shortening | 54.00 | 0 |
| Margarine | 0 | 13.50 |
| Non-Fat Milk Solids | 11.20 | 11.20 |
| Baking Powder | 6.05 | 8.50 |
| Salt | 4.80 | 2.20 |
| Oat Flour Gel[4] | 0 | 40.50 |
| Sucrose Ester[5] | 0 | 1.20 |
| Vanilla | 1.20 | 1.20 |
| Total | 500.00 | 500.00 |

[4]Gels prepared from oat bran and oat bran concentrate gels can also be used.
[5]The sucrose ester is an emulsifier.

Both types of cakes are prepared as follows: (1) mix the dry ingredients for 1 minute in a Hobart 5 qt. mixer on low speed; (2) add the oat flour gel and/or shortening or margarine and mix for 1 minute on low speed; (3) add the remaining ingredients and mix the resulting mixture on low speed for 30 seconds, on high speed for 2 minutes, on medium speed for 2 minutes, and on low speed for 1 minute;

(4) pour the resulting batter into a well greased and lightly floured 8" diameter cake pan; (5) bake at 350° F. for 30 minutes or until cake is done; (6) let the baked cake cool for 10 minutes before removing from pan. The low-fat products are very similar to the full-fat products in terms of texture (softness and chewiness), appearance (color, volume, and surface texture), and mouthfeel.

Example 5

Regular and low fat cookies are prepared using the following formulas and process (note that the values provided represent grams of each ingredient):

| INGREDIENT | CONTROL | LOW FAT COOKIES |
| --- | --- | --- |
| All-Purpose Flour | 24.60 | 24.60 |
| Chocolate Chips | 24.60 | 24.60 |
| Sugar | 18.45 | 16.45 |
| Margarine | 16.50 | 4.12 |
| Whole Fresh Eggs | 8.20 | 8.20 |
| Brown Sugar | 6.15 | 4.15 |
| Salt | 0.50 | 0.50 |
| Baking Soda | 0.50 | 0.50 |
| Vanilla | 0.50 | 0.50 |
| Oat Flour Gel[6] | 0 | 12.45 |
| Sucrose Ester[7] | 0 | 0.12 |
| Water | 0 | 3.81 |
| Total | 100.00 | 100.00 |

[6]Gels prepared from oat bran and oat bran concentrate gels can also be used.
[7]The sucrose ester is an emulsifier.

Both types of cookies are prepared as follows: (1) place the brown sugar, sugar, emulsifier, margarine, and oat flour gel (where applicable) in a mixing bowl; (2) cream the resulting mixture for 2 minutes on medium speed; (3) add the eggs and vanilla to the creamed mixture and mix the resulting mixture for 1 minute on medium speed; (4) scrape the mixing bowl and mix for an additional minute on medium speed; (5) add the dry ingredients to the bowl and mix the resulting mixture for 1 minute on medium speed; (6) scrape the bowl; (7) add water to the bowl and mix for 2 minutes on medium speed; (8) fold in chocolate chips; (9) drop the resulting cookie dough onto a well greased cookie sheet using a teaspoon for the individual cookie sizes; (10) bake at 350° F. for 20 minutes or until done. The low-fat products are very similar to the full-fat products in terms of texture (softness and chewiness), appearance (color, volume, and surface texture), and mouthfeel.

What is claimed is:

1. A process for preparing a baked food product containing little or no fat, which process comprises:
   (a) preparing an initial mixture comprising from about 10% to about 35% by weight, as a percentage of the initial mixture, of an oat component selected from the group consisting of oat flour, oat bran, oat bran concentrate, defatted oat flour, derailed oat bran, defatted oat bran concentrate, and mixtures thereof, and wherein the balance of the initial mixture comprises water;
   (b) hydrating the oat component in the initial mixture to form a hydrated mixture having a gel strength in the range of from about 288 mm to about 400 mm, as measured by a Universal penetrometer using a dish size of 5 cm diameter and a depth of 1.3 cm;
   (c) combining the hydrated mixture with flour and other ingredients necessary for preparing a baked product, thereby forming a baking mixture, wherein the amount of hydrated mixture combined is that amount sufficient to provide a low-fat or no-fat baked product having taste and textural properties which are substantially similar to the taste and textural properties of a full-fat version of the baked product; and
   (d) heating the baking mixture for a sufficient time and temperature to prepare a fully baked product.

2. A process according to claim 1 wherein the oat component comprises from about 20% to about 30% by weight of the initial mixture, expressed as a percentage of the initial mixture.

3. A process according to claim 2 wherein the oat component is selected from the group consisting of oat flour, defatted oat flour, and mixtures thereof.

4. A process according to claim 3 wherein the hydrated mixture is prepared by heating the initial mixture to a temperature in the range of from about 45° C. to about 60° C.

5. A process according to claim 4 wherein the hydrated mixture exhibits a gel strength in the range of from about 294 mm to about 375 mm, as measured by a Universal penetrometer using a dish size of 5 cm diameter and a depth of 1.3 cm.

6. A process according to claim 5 wherein the baking mixture comprises from about 4% to about 20% by weight hydrated mixture and from about 20% to about 55% by weight flour, based on the weight of the baking mixture.

7. A process according to claim 6 wherein the baking mixture is baked at a temperature in the range of from about 193° C. to about 243° C. for a period of time in the range of from about 13 to about 20 minutes, and wherein the fully baked product is a biscuit.

8. A process for preparing a baked biscuit containing little or no fat, which process comprises:
   (a) preparing an initial mixture comprising from about 22% to about 28% by weight of oat flour, based on the weight of the initial mixture, and wherein the balance of the initial mixture comprises water;
   (b) hydrating the oat flour contained in the initial mixture by heating the initial mixture to a temperature in the range of from about 50° C. to about 55° C., thereby forming a hydrated mixture having a gel strength in the range of from about 325 mm to about 367 mm, as measured by a Universal penetrometer using a dish size of 5 cm diameter and a depth of 1.3 cm;
   (c) combining the hydrated mixture with wheat flour and other ingredients necessary for preparing a baked product, thereby forming a baking mixture, wherein the baking mixture comprises from about 5% to about 15% by weight hydrated mixture, and from about 25% to about 40% by weight wheat flour; and
   (d) heating the baking mixture at a temperature in the range of from about 211° C. to about 238° C. for a period of time in the range of from about 8 to about 15 minutes.

9. A method wherein a hydrated mixture consisting essentially of water and from about 15% to about 35%, expressed as a dry weight percentage of the hydrated mixture, of an oat component selected from the group consisting of oat flour, oat bran, oat bran concentrate, defatted oat flour, defatted oat bran, defatted oat bran concentrate, and mixtures thereof, is used as a fat replacement in the preparation of baked goods, wherein said hydrated mixture has a gel strength in the range of from about 288 mm to about 400 mm, as measured by a Universal penetrometer using a dish size of 5 cm diameter and a depth of 1.3 cm.

* * * * *